(12) United States Patent
Eichfeld

(10) Patent No.: US 10,447,841 B2
(45) Date of Patent: Oct. 15, 2019

(54) WIRELESS PAIRING AND CONTROL USING SPATIAL LOCATION AND INDICATION TO AID PAIRING

(71) Applicant: BOSE CORPORATION, Framingham, MA (US)

(72) Inventor: Jahn D. Eichfeld, Natick, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/613,521

(22) Filed: Jun. 5, 2017

(65) Prior Publication Data
US 2018/0352070 A1    Dec. 6, 2018

(51) Int. Cl.
| | |
|---|---|
| *G06F 3/01* | (2006.01) |
| *H04W 4/80* | (2018.01) |
| *H04R 5/02* | (2006.01) |
| *H04M 1/725* | (2006.01) |
| *H04N 21/422* | (2011.01) |
| *H04N 21/4363* | (2011.01) |
| *H04B 7/26* | (2006.01) |
| *H05B 37/02* | (2006.01) |
| *H04W 76/14* | (2018.01) |
| *G06F 3/16* | (2006.01) |
| *H04R 1/10* | (2006.01) |
| *H04W 4/02* | (2018.01) |

(Continued)

(52) U.S. Cl.
CPC ......... *H04M 1/72533* (2013.01); *G06F 3/011* (2013.01); *G06F 3/016* (2013.01); *G06F 3/017* (2013.01); *G06F 3/04842* (2013.01); *G06F 3/167* (2013.01); *H04B 7/26* (2013.01); *H04N 21/42207* (2013.01); *H04N 21/43637* (2013.01); *H04R 1/1041* (2013.01); *H04W 4/026* (2013.01); *H04W 4/80* (2018.02); *H04W 76/14* (2018.02); *H05B 37/0272* (2013.01); *H04R 5/02* (2013.01); *H04R 2420/07* (2013.01); *H04S 7/301* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 2010/0211698 A1* | 8/2010 | Krishnaswamy | H04W 4/003 710/11 |
| 2011/0043496 A1* | 2/2011 | Ray Avalani | B60R 1/00 345/204 |

(Continued)

OTHER PUBLICATIONS

International Search Report and Written Opinion for International Application No. PCT/US2018/034548 dated Sep. 6, 2018, 14pp.

*Primary Examiner* — Alejandro Rivero
(74) *Attorney, Agent, or Firm* — Patterson + Sheridan, LLP

(57) ABSTRACT

Aspects of the present disclosure provide an apparatus for wireless communication, at least one processor configured to determine a spatial location for a discovered wireless device, a user interface configured to output an indication of the discovered device and its spatial location, a receiver configured to receive a user input, and a communication unit configured to interact with the selected device. The at least one processor is further configured to select the discovered wireless device for interaction based on a relationship between the user input and the outputted indication.

16 Claims, 6 Drawing Sheets

(51) Int. Cl.
*G06F 3/0484* (2013.01)
*H04S 7/00* (2006.01)

(56) References Cited

U.S. PATENT DOCUMENTS

| | | | |
|---|---|---|---|
| 2013/0204939 A1* | 8/2013 | Yajima | H04W 8/24 |
| | | | 709/204 |
| 2014/0118631 A1 | 5/2014 | Cho | |
| 2015/0133051 A1* | 5/2015 | Jamal-Syed | H04M 1/7253 |
| | | | 455/41.2 |
| 2016/0070439 A1* | 3/2016 | Bostick | G06F 3/04842 |
| | | | 715/728 |
| 2016/0217617 A1* | 7/2016 | Barribeau | G06F 3/04815 |
| 2017/0061692 A1* | 3/2017 | Giraldi | G06T 19/006 |
| 2017/0223579 A1* | 8/2017 | Lee | H04W 48/14 |

* cited by examiner

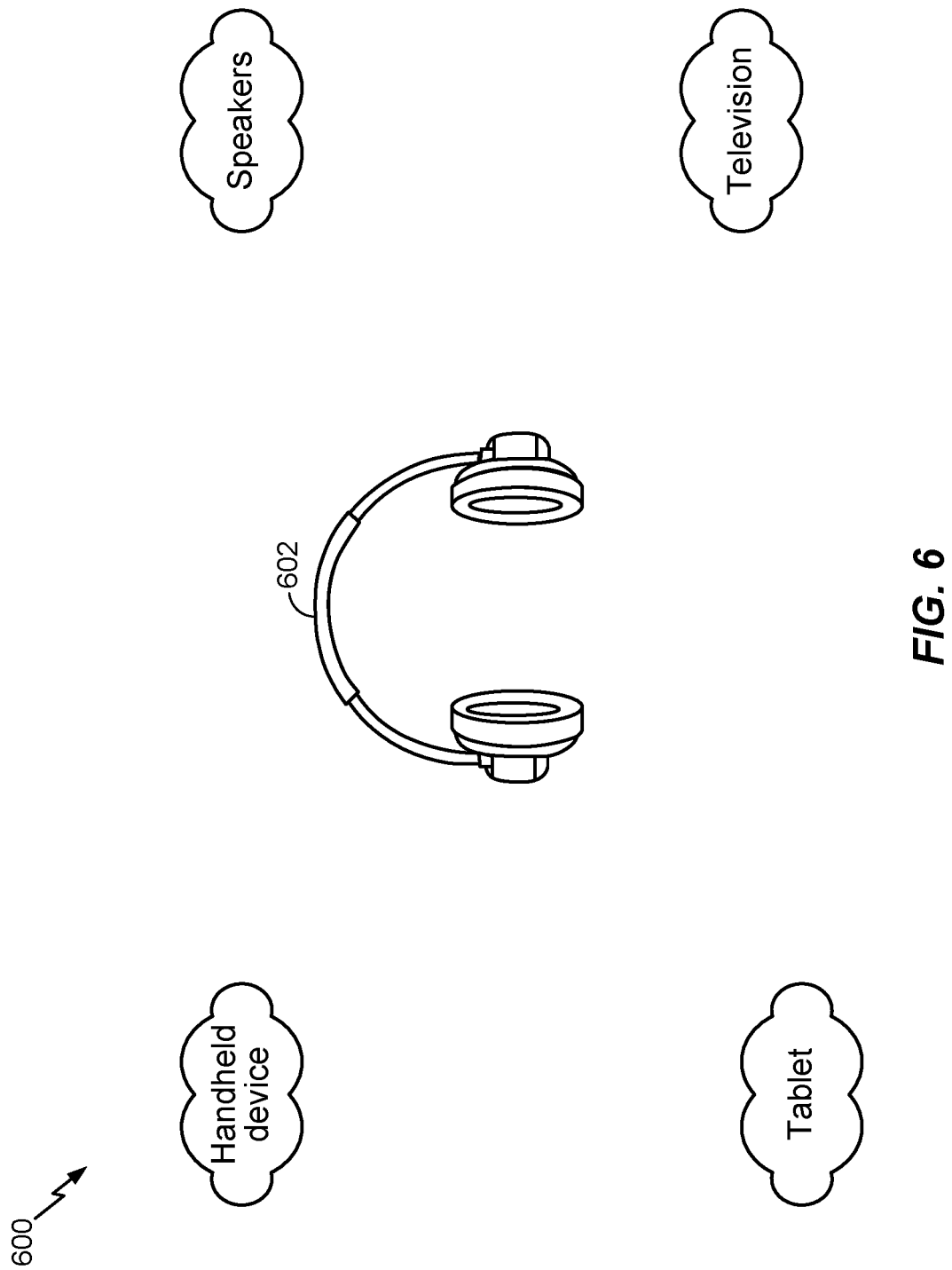

WIRELESS PAIRING AND CONTROL USING SPATIAL LOCATION AND INDICATION TO AID PAIRING

BACKGROUND

Aspects of the present disclosure generally relate to wireless technology and, more particularly, to selection and pairing of devices configured to wirelessly communicate.

Bluetooth (Bluetooth Specification Version 5.0 [Vol 0], 6 Dec. 2016) is a wireless technology standard for exchanging data between electronic devices over short distances. Before a device communicates with another device via Bluetooth, the devices must establish a connection. This requires several steps. First, one device discovers connectable devices. Connectable devices are typically then shown to the user as a list of device names. Second, the user must choose the correct device to connect to based on its device name in the list. Third, the two devices exchange information in order to establish a bond in a process known as pairing. Fourth, a connection is established.

This multi-step process can be a cumbersome, time-intensive, non-intuitive process for a user. As an example, the device names shown to the user during discovery may not sufficiently identify the device the user wishes to connect to or the function of that device. Also, there may be numerous devices in the discovery list including devices not within proximity for practical use, complicating the selection of the desired device. As the number and types of wireless devices increases and in-view of the projected advancements of wireless communications, including the Internet of Things (IoT), there is a need to improve: the discovery and selection processes whereby the user finds and selects the device they wish to interact with, and the process for reconnecting to previously-bonded devices. More generally, there is a need to improve the process for one device selecting and connecting to another device, independently of whether paring is required. While aspects are described with reference to Bluetooth technology, the need for improving the connection process is equally applicable to other wireless protocols.

SUMMARY

All examples and features motioned herein can be combined in any technically possible manner. Aspects of the present disclosure describe methods and apparatus for wireless selection, pairing, and control for Bluetooth-enabled wireless devices; however the present disclosure is not limited to Bluetooth technology. Aspects described herein apply to any communication standard used to wirelessly connect devices.

According to an aspect, a method for wireless communication by an apparatus is provided. The method generally includes determining a spatial location for a discovered wireless device, outputting an indication of the discovered device and its spatial location, receiving a user input, based on a relationship between the user input and the outputted indication, selecting the discovered wireless device, and interacting with the selected device.

According to an aspect, outputting the indication of the discovered device and its spatial location comprises outputting, via a user interface, a visual display the discovered device, wherein the visual display illustrates the spatial location for the discovered device.

According to an aspect, outputting the indication of the discovered device and its spatial location comprises outputting a spatialized audio prompt based, at least in part, on the spatial location for the device. In one example, the spatialized audio prompt announces a type of the discovered device and direction of the discovered device relative to the apparatus. Additionally or alternatively, the method further comprises determining a direction of the apparatus correlates with a location of the discovered device and outputting the spatialized audio prompt based, at least in part, on the correlation.

According to an aspect, the method further comprises determining a change in an orientation of the apparatus and updating the outputted indication of the discovered device and its spatial location based on the determined change.

According to an aspect, outputting the indication of the discovered device and its spatial location comprises outputting haptic information associated with the spatial location of the discovered device.

According to an aspect, the method further comprises determining a spatial location for at least another discovered device and outputting an indication of a subset of the discovered devices, wherein the subset is determined based, at least in part, on a common characteristic associated with each device in the subset.

According to an aspect, receiving the user input comprises receiving a selection of the selected device via a user interface, wherein the user interface illustrates the spatial location of the discovered device.

According to an aspect, receiving the user input comprises receiving a selection of the selected device via an audio input.

According to an aspect, receiving the user input comprises receiving a selection of the selected device via a gesture in a same direction as a location of the selected device.

According to an aspect, the method further comprises determining the apparatus is proximate to a number of devices greater than a threshold value, and in response to the determination, determining the spatial location for at least a subset of the number of devices and outputting the indication of at least the subset of the number of devices and their spatial location.

According to an aspect, the interacting comprises pairing with the selected device and wirelessly communicating with the selected device.

According to an aspect, the apparatus is configured to wirelessly communicate with the device via a Bluetooth connection.

According to an aspect, an apparatus for wireless communication is provided. The apparatus comprises at least one processor configured to determine a spatial location for a discovered wireless device, a user interface configured to output an indication of the discovered device and its spatial location, a receiver configured to receive a user input, and a communication unit configured to interact with the selected device. The processor is further configured to select the discovered wireless device for interaction based on a relationship between the user input and the outputted indication. According to an aspect, the processor select the discovered wireless device based, at least in part, on input receive via the receiver and/or user interface.

According to an aspect, the user interface is configured to output the indication of the discovered device and its spatial location by outputting a visual display of the discovered device, wherein the visual display illustrates the spatial location for the discovered device.

According to an aspect, the user interface is configured to output the indication of the discovered device and its spatial location by outputting a spatialized audio prompt based, at least in part, on the spatial location for the discovered device.

According to an aspect, the spatialized audio prompt announces a type of the discovered device and direction of the discovered device relative to the apparatus.

According to an aspect, the at least one processor is further configured to determine a direction of the apparatus correlated with a location of the discovered device and the user interface is configured to output the spatialized audio prompt based, at least in part on the correlation.

According to an aspect, the at least one processor is further configured to determine a change in an orientation of the apparatus and the user interface is further configured to update the outputted indication of the discovered device and its spatial location based on the determined change.

Specific features are described as being performed by example components of an apparatus for illustrative purposes only. One or more components may perform the features described herein.

Advantages of the methods and apparatus described herein include streamlining the pairing and selection process, thereby allowing an easier, straightforward, and consistent manner to effectively use multiple wireless devices. Other features and advantages will be apparent from the description and the claims.

BRIEF DESCRIPTION OF THE DRAWINGS

FIG. 6 illustrates an example of receiving auditory prompts at a sink device, where the prompts are received in the direction of a respective, discovered device.

DETAILED DESCRIPTION

Aspects of the present disclosure relate to selection and pairing of devices configured to communicate wirelessly.

Before communication between two wireless devices occurs, the devices must discover each other. After discovery, the devices engage in a pairing process. Once pairing (e.g., Bluetooth pairing) has occurred, the two discovered, paired devices are bonded and can connect and communicate with each other. According to aspects, during the pairing process, one device may transmit an advertisement via Bluetooth that contains an internet protocol (IP) address to another device. The devices connect over the internet (and not over the original Bluetooth protocol containing the advertisement).

Bluetooth pairing is generally initiated manually by a user of a wireless device. Upon initiating of the pairing process, the Bluetooth link for one device is made visible to other devices through a discovery process. One of the other devices is then told to pair with the first device. For Bluetooth pairing to occur, a password may be exchanged between the two devices. This password ensures that both devices have been intentionally paired with each other. After pairing, the two devices are bonded, meaning they share an encryption key, remember each other's wireless address, and can establish a connection and communicate via Bluetooth. In some implementations, a secondary short-range communication technology, such as near-field-communication (NFC) or Bluetooth Low Energy (BLE—an extension of the Bluetooth protocol itself) is used to initiate pairing or perform the password exchange, decreasing the need for user interaction. In other implementations, no password is required.

Figure 1:
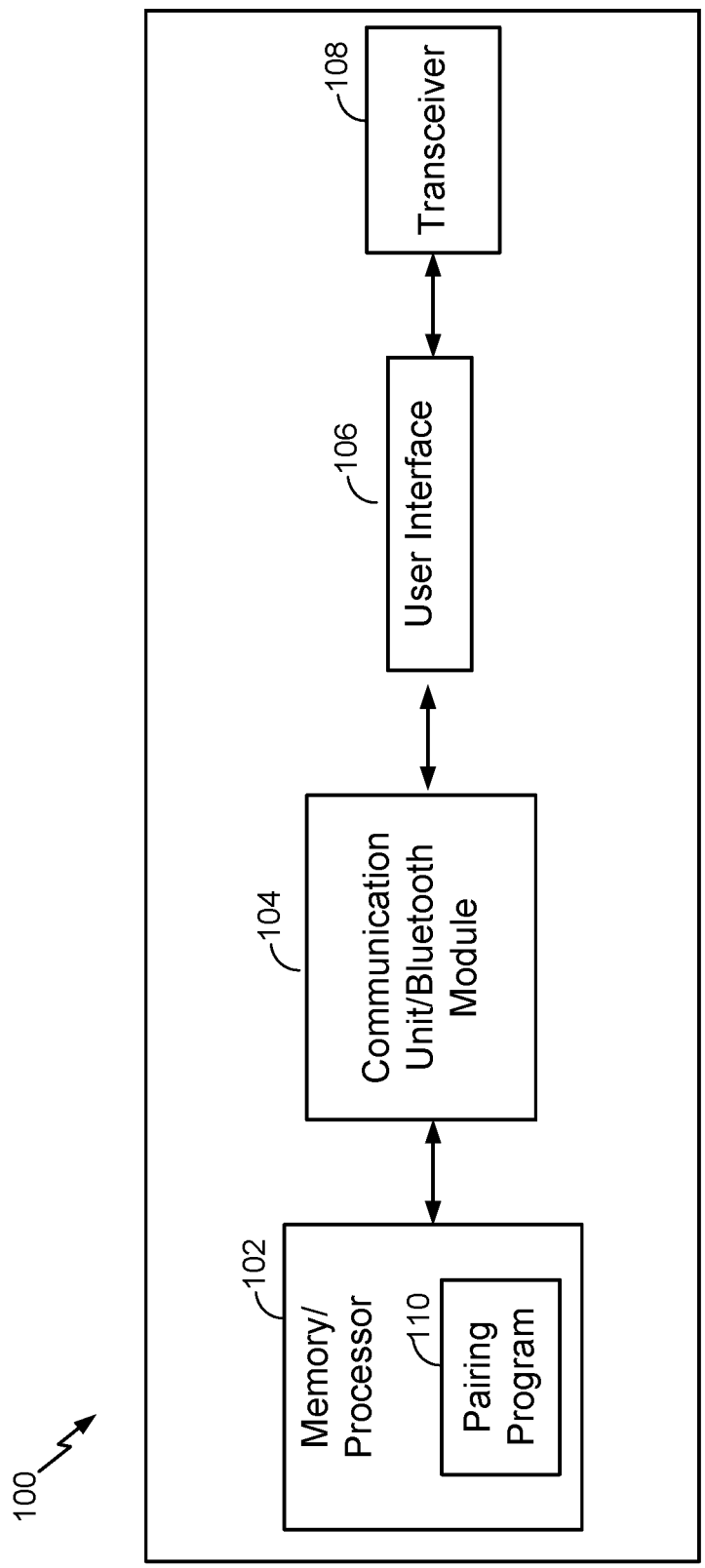
FIG. 1 is a block diagram of a Bluetooth configured wireless device.

FIG. 1 illustrates an example Bluetooth-configured wireless device 100. According to aspects, a Bluetooth-connectable device includes the components illustrated in FIG. 1. Example Bluetooth-enabled devices 100 include, but are not limited to, a smartphone, health tracking wearable, headset, tablet computer, personal computer, laptop computer, audio system, television, kitchen appliance, entertainment system, speaker, security system, printer, and so on.

The Bluetooth-configured wireless device 100 includes a memory and processor 102, communication unit/Bluetooth module 104, user interface (UI) 106, and transceiver 108. The memory may include Read Only Memory (ROM), a Random Access Memory (RAM), and/or a flash ROM. The memory stores program code for controlling the memory and processor 102. The memory and processor 102 control the operations of the wireless device 100. Any or all of the components in FIG. 1 may be combined into multi-function components.

The memory and processor 102 includes a paring program 110. As will be described in more detail herein, after the wireless device 100 discovers one or more other devices, the pairing program 110 is used to connect to a desired, discovered device. Thereafter, the wireless device 100 exchanges information (i.e., communicates) with the desired, selected, paired wireless device. According to aspects, the wireless device 100 communicates with another wireless device over the internet, using an IP address contained in an advertisement transmitted via Bluetooth.

The processor 102 controls the general operation of the wireless device 100. For example, the processor 102 performs process and control for audio and data communication. In addition to the general operation, the processor 102 initiates a Bluetooth function implemented in the Bluetooth module 104 upon detecting certain events, fully described below. The processor 102 initiates an operation (e.g., pairing) necessary for a Bluetooth connection of the Bluetooth-enabled device 100 with another Bluetooth-enabled device (not illustrated in FIG. 1).

The communication unit 104 facilitates a wireless connection with one or more other (not illustrated) wireless devices. The communication unit 104 includes a Bluetooth module, which enables a connection using Radio Frequency (RF) communication between the wireless device 100 and discovered, selected, paired device. In addition to or instead of the Bluetooth module, the wireless device may include one or more other modules (not illustrated) to enable communication via another communication protocol with a discovered, selected device.

The user interface 106 outputs a spatial position of Bluetooth-enabled devices as described herein. The spatial position is indicated via one or more of a visual output, haptic output, or audio prompts provided by the UI 106.

The UI 106 also receives, from a user of the wireless device 100, one or more inputs regarding the selection of a discovered wireless device which the wireless device 100 should connect to or control. Examples of controlling the selected wireless device include receiving information from the selected wireless device or transmitting information to the selected wireless device. The UI may receive the input of a selected device from the user via one of touch, audio, or movement from the user of the wireless device 100.

The transceiver 108 transmits and receives information via one or more antenna (not illustrated) to exchange information with one or more other wireless devices. In this manner, the wireless device 100 communicates with one or more other discovered, selected wireless devices. The transceiver 108 is not necessarily a distinct component. The transceiver may be implemented entirely in software executed by the Bluetooth module 104.

Figure 2:
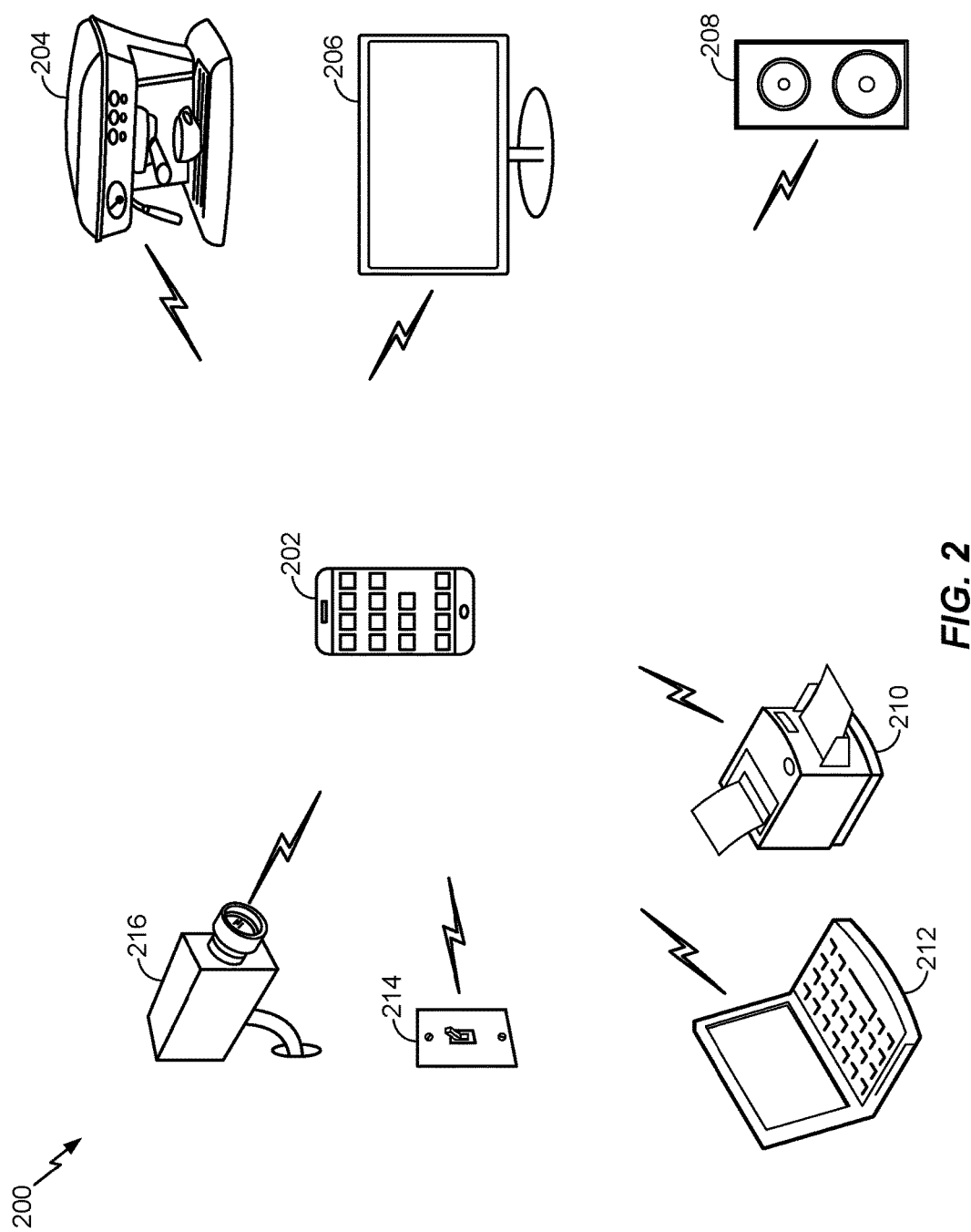
FIG. 2 is an example environment illustrating a source device and several potential sink devices.

FIG. 2 illustrates an example environment 200 with a main device and several potential wirelessly-connected devices. A mobile device 202 may be a main device looking for potential devices that the mobile device 202 may wish to connect with and control, or it may be a device looking for potential main devices to receive data from. The environment 200 illustrates several Bluetooth-enabled devices that may potentially communicate with the Bluetooth-enabled mobile device 202.

In the environment 200, a kitchen appliance, such as a coffee maker 204 is located to the right, slightly above the mobile device 202. A television 206 is located to the right of the mobile device 202, and speakers 208 are located to the right, for example, on the floor, below the mobile device 202. A laptop 212 and printer 210 are located to the left and below the mobile device 202. A light switch 214 is located to the left of the mobile device 202. A security camera 216 is located to the left, above the level of the mobile device 202.

While each of the coffee maker 204, television 206, speakers 208, printer 210, laptop 212, light switch 214, and security camera 216 are Bluetooth enabled, a user of the mobile device 202 may only wish to connect to one of the devices. For example, the user may want to stream music from the mobile device 202 to the speakers 208.

Figure 3:
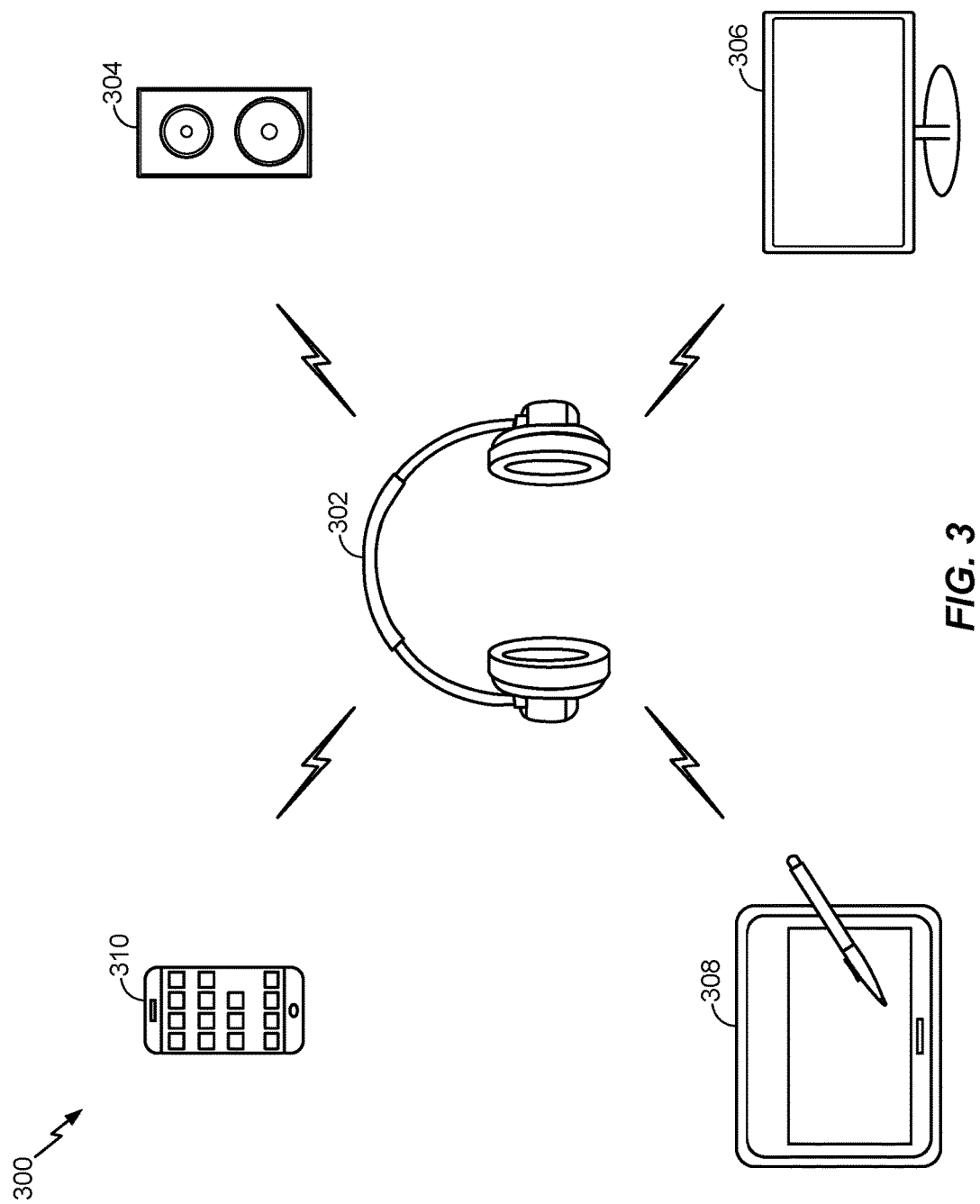
FIG. 3 is an example environment illustrating a sink device and several potential source devices.

FIG. 3 illustrates an example environment 300 with a headset and several potential devices the headset may communicate with. In the environment 300, the wireless headset 302 is surrounded by several Bluetooth-enabled devices that may communicate with the headset 302. For example, wireless speaker 304 is located to the right, at an elevation above the user of the headset 302. A television 306 is located to the right, at an elevation below the user of the headset 302. A tablet 308 is located to the left, at an elevation below the user of the headset 302. A handheld device 310 is located to the left, at an elevation above the user of the headset 302.

While each of the speakers 304, television 306, tablet 308, and handheld device 310 are Bluetooth-enabled, the user of the headset 302 may only wish to connect to one of the devices 304-310. For example, the user may want to receive data from the television 306.

Before a mobile device 202 communicates with the speakers 208 in FIG. 2 or before a headset 302 communicates with the television 306 in FIG. 3, the mobile device 202 and speakers 208 must pair and the headset 302 and the television 306 must pair.

As described above, the typical pairing process is cumbersome and non-intuitive for some users. Furthermore, specific steps of pairing may vary from one device to another device. Due to the prevalence of wireless devices, it is desirable to improve the process of selecting a device to pair with and controlling the device after pairing. Using the methods and apparatus described herein, a user of a wireless device quickly, easily, and consistently connects to another wireless device. Additionally, the user may easily switch connections from a connected wireless device to another connected wireless device.

Figure 4:
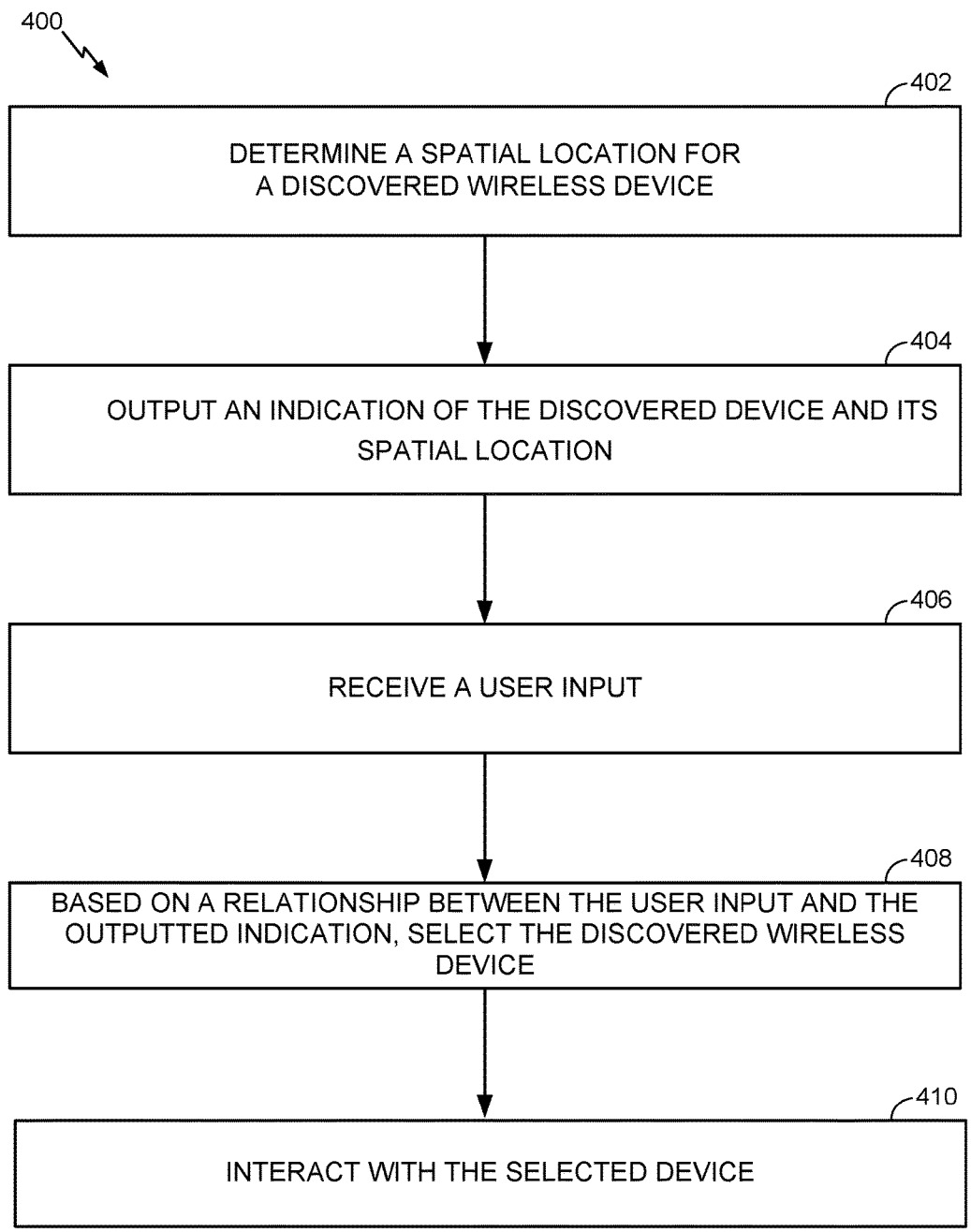
FIG. 4 is a flow diagram illustrating example steps for wireless selection, pairing, and control.

FIG. 4 illustrates example operations 400 performed by a wireless apparatus. The wireless apparatus includes any of the wireless devices illustrated in FIGS. 2 and 3, or similar devices. The wireless apparatus has one or more of the components illustrated in FIG. 1.

At 402, the wireless apparatus determines a spatial location for a discovered wireless device. As will be described in more detail herein, a first device is able to determine a spatial location for discovered devices. At 404, the apparatus outputs an indication of the discovered device and its spatial location. At 406, the apparatus receives a user input. At 408, based on a relationship between the user input and the indication output by the apparatus regarding the discovered device, the apparatus selects the discovered wireless device. According to an example, the apparatus correlates the user input to the outputted indication. The received indication is correlated by time or by matching in a graphical user interface with the outputted indications. At 410, the apparatus interacts with the selected device, e.g., it pairs with or connects to it.

Referring to 402, the wireless apparatus determines a spatial location for at least one other device in a vicinity of the apparatus. The spatial location may include x, y, and z coordinates for a device, or it may be a radial position, possibly with elevation angle or distance away as well, or some combination of such dimensions. The location may be determined relative to the apparatus, or the location of both the devices and the apparatus may be determined relative to a common reference. According to one example, with reference to FIG. 2, mobile device 202 determines both the direction and distance to one or more of the wireless devices 204-216. According to another example, with reference to FIG. 3, the headset 302 determines the direction and distance to one or more of the wireless devices 304-310. Determination of spatial location need not be done by a single device—the wireless apparatus may comprise one or more electronic devices distributed throughout one or several environments. According to an example, the one or more electronic devices distributed throughout an environment may transmit information to the mobile device 202 or the headset 302 in an effort to provide more accurate spatial location estimates.

As an example, the direction between the first device and the second device is determined through the use of radio frequency (RF) array processing. Some wireless devices may have multiple and/or directional antennae and others may not have multiple and/or directional antennae. According to an aspect, the RF processing includes processing from two or more antennae at one or each of the wireless devices. Additionally or alternatively, the RF processing is performed using one or more directional antennae at one or each of the wireless devices. The user's device performs signal processing of the received signals to determine an angle-of-arrival with respect to various potential devices to pair with. According to aspects, the orientation of the user's device, via a multi-axis accelerometer, is used to aid in the accuracy of angle-of-arrival estimation and calculations.

The distance between the devices may be estimated based on one or more of receive signal strength indicator (RSSI), quality of service (QoS) metrics unique to the protocol, or a nearfield effect of an array of antennas or directional antennas on the device.

The above procedure results in a user's device knowing the direction and distance to one or more devices it may pair within a certain proximity. Accordingly, the device knows the respective spatial location for one or more discovered wireless devices.

Next, the device aids the user in the selection and pairing process.

At 404, the user's device outputs an indication of at least a subset of the discovered devices and their respective spatial locations. In the example of FIG. 2, the mobile device 202 is the user's device looking for potential devices to pair with. After determining a spatial location for one or more discovered devices, the mobile device outputs spatialized prompts, such as icons on its display, to allow a user local to the mobile device 202 to quickly and easily identify the potential connectable devices. In the example of FIG. 3, the headset 302 is the user's device looking for potential devices to pair with. After determining a spatial location for one or more discovered devices, the headset outputs spatialized audio prompts to allow a user local to the headset 302 to quickly and easily identify the potential devices.

Figure 5:
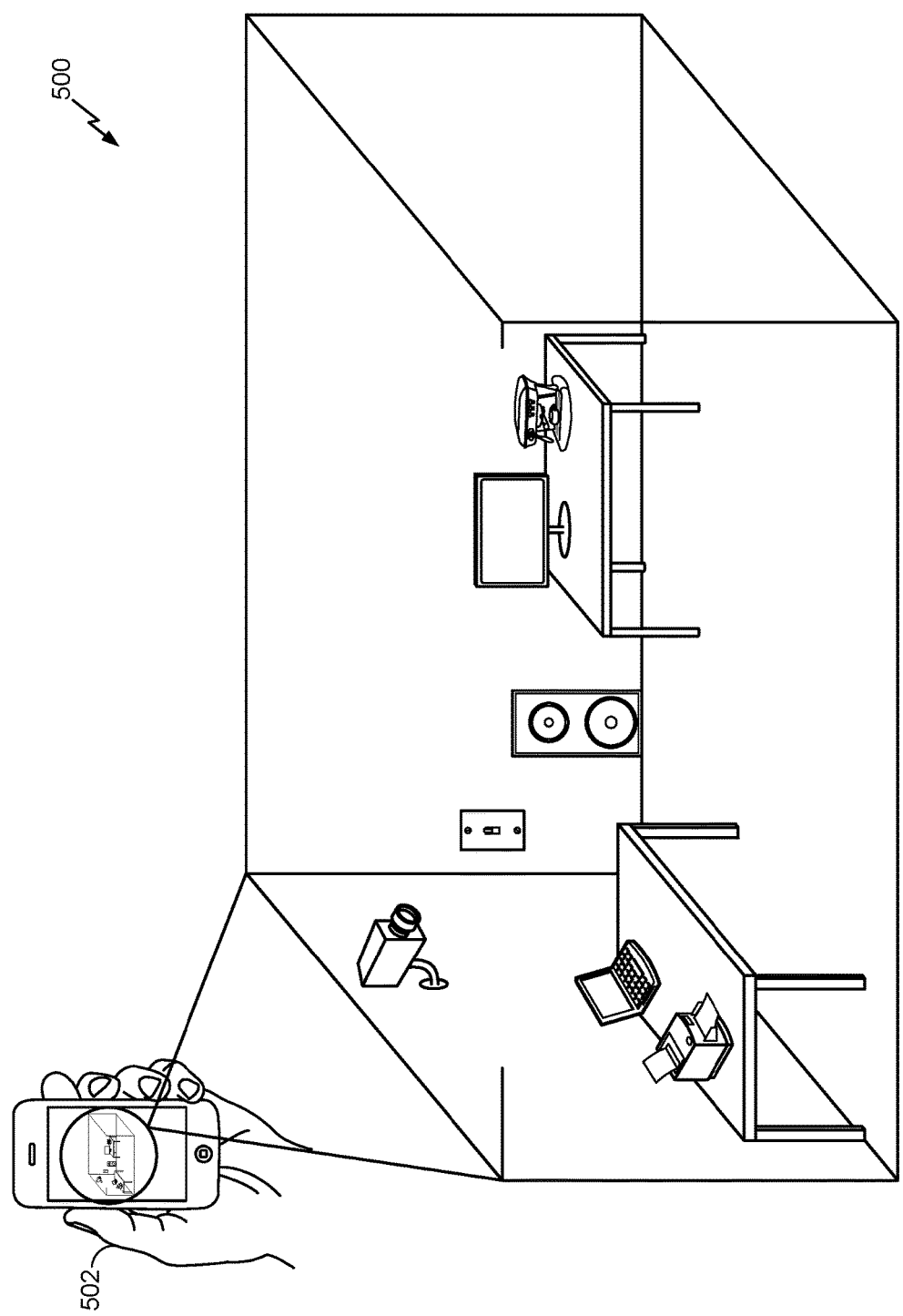
FIG. 5 is an example of a graphical output illustrating discovered devices in a spatially accurate visual display.

FIG. 5 illustrates an example of a graphical output 500 illustrating discovered devices in a spatially representative visual display. The graphical output 500 illustrates the discovered, connectable devices as located in a three-dimensional space. The graphical output 500 represents the screen of the mobile device 202 in an environment including the devices illustrated in FIG. 2. After the mobile device 202 determines the direction and distance to one or more connectable devices in a certain proximity, the mobile device outputs a spatially representative visual representation of the discovered devices. As illustrated in FIG. 5, the elevation and direction of connectable devices relative to the user's device are visually displayed.

In some examples, the visual depiction corresponds to a plan view of the user's environment, i.e., the positions indicate that the camera and coffee maker are in front of the user, and the speaker, computer, and printer are behind the user. If the user turns around, moving the mobile device to face a different direction, the display is updated.

In other examples, the visual depiction may provide an augmented reality display on the mobile device. The vertical positions of the devices may be indicated, such as by using a three-dimensional depiction of the user's environment, or through an augmented-reality display, where indications of device availability are overlayed on a photographic view of the environment. In certain graphical outputs, the user may be shown standing in the environment. The graphical output can include a name of the device hovering in proximity to the visual image of the device. For example, the graphical output may include an overlay of text on top of each device with the respective device's name. Additionally or alternatively, the graphical output may include other visual indicators, such as, color, or a shape around a wireless device. In this manner, the graphical output provides an accurate, spatial representation of the available devices relative to the user 502.

FIG. 6 illustrates an example of receiving auditory prompts 600 at a headset device 602. The headset 602 represents the headset 302 illustrated in the environment 300 in FIG. 3. As described above, the headset 602 determines the direction and distance to one or more other devices. For example, the headset 602 may conduct angle-of-arrival estimation and proximity estimation to potential devices. Thereafter, the headset 602 outputs an indication of spatial locations for the other devices. An example of the output includes spatialized audio prompts that correspond to the location of the possible connectable devices.

As illustrated in FIG. 6, the headset 602 provides an audio prompt to the user indicating that speakers are located to the right and in front of the user, a television is located to the right and behind the user, a tablet is located to the left and behind the user, and a handheld device is located to the left and in front of the user. The prompts may verbally explain where the devices are located, or they may be spatialized, as described below. Thus, the headset 602 outputs audio prompts, which allow user local to the headset 602 to quickly identify the location of each potential device.

According to one example, the headset 602 includes an accelerometer. The accelerometer indicates to the processor which direction the user is looking.

When the user of the headset 602 turns in the direction of, for example, the speakers, the headset 602 outputs an audio prompt "speakers" to alert the user that discovered speakers are in the line of sight of the user. In this manner, the user simply looks around the room, and is prompted whenever they are looking at a device that the headset could pair with. Rather than speaking the name of the device, the headset may output a ding or a buzz.

In another example, the headset may include a vibrating motor or other haptic output (or haptic output may be accomplished by vibrating the speakers of the headset at very low frequencies). This can be used to guide the user to look in the direction of potential devices, by vibrating on the left or right, to nudge the user to looking in that direction. The headset 602 guides the user to turn their head to the right, in the direction of the speakers and televisions, and announce the devices when the user is looking at them. Similarly, the headset 602 nudges the user's head to the left, in the direction of the tablet and handheld device, and announces those devices. In this manner, haptics and audio prompts are combined to aid in the selection and pairing process. In some examples, spatial cues are combined with verbal cues, such that the user is prompted to look up or down if facing the right direction but not looking at the right elevation to see the device being indicated.

In another example, the user of the headset 602 is further aided in identifying and selecting a connectable device where the auditory spatial indication prompts are rendered such that they seem to arrive from the direction of the respective device. As an example, the user of the headset 602 hears "speaker" and "television" spoken on the right side of the user. The user of the headset 602 hears "tablet" and "handheld device" spoken on the left side of the user. Thus, the user is aided in finding all or a subset of the available devices in an intuitive, spatial fashion. Controlling the angular direction from which a prompt seems to originate is a simple matter of controlling the relative level and timing of left and right audio signals presented to the user's ears, for example per a head-related transfer function (HRTF) model. Adding auditory cues to indicate the elevation of a device is more complicated, but can be done in some cases, for example, with HRTF modelling in conjunction with accelerometer-based head motion cues, or through the use of more than one speaker in each earcup of the headset.

In aspects, the auditory prompts convey not only the type of device (e.g., speakers, television, etc.,) but also the function of the discovered device. For example, the auditory prompt says "television, audio" to convey that the television provides an audio input to the headset 602.

Similar to the user of the headset receiving auditory prompts or haptic cues indicating the location and/or functionality of one or more potential source devices, a user of the mobile device 202 may also receive auditory and/or haptic indications of potential connectable devices.

According to an aspect, the apparatus intelligently determines a subset of the discovered devices for which a respective spatial location is outputted via the UI. In this manner, the apparatus does not necessarily output an indication of the spatial location of every discovered device. According to one example, a user local to the apparatus is positioned in an environment with several connectable devices. The apparatus local to the user provides a spatial indication of a subset of devices that the apparatus determines is of interest to the user.

The apparatus can determine the subset of devices based on one or more factors. The subset of devices can be determined based on a physical proximity to the apparatus. The apparatus may determine that devices beyond a certain physical proximity are unlikely to be of interest to the user. Accordingly, the subset may include connectable devices located less than a threshold distance away from the apparatus. A connectable device located far away from the apparatus will not be included in the subset.

The subset of devices can be limited to a certain number of devices. Capping the number of devices in the subset may help to not confuse the user by providing an indication of every proximate, connectable device. The apparatus may output up to a threshold number of discovered devices. According to an example, the threshold number of devices is 25 and the apparatus discovered 50 connectable devices. The apparatus may only provide a spatial location for 25 of the 50 devices.

The subset of devices may be selected by the apparatus based on the type of service provided. The apparatus provides a spatial indication of devices that may be more relevant to (of interest to) the user. According to an example, headsets may determine the subset based on discovered devices that are capable of streaming music. The headsets may determine that a printer or light switch does not belong in the subset of devices.

The subset of devices may be based on learned behavior. The controller of the apparatus may use past usage of the apparatus to intelligently determine which devices to include in the subset. According to one example, a headset determines that the user is interested in hearing a stream of music. Thus, the headset determines devices that share a common characteristic, such as the ability to stream music to the headset, and includes those devices in the subset.

Referring to the headsets 302, the UI outputs an indication of only the speakers 304 and the television 306. In this example, the headset determines a location of one or more of the devices 304-310; however, the headset intelligently determines which subset of devices to display. The headset uses past usage of the headset by the user or common usages of the device local to the user in an effort to intelligently determine the subset of devices to for which a spatialized location is to be provided. In this manner, a spatial location for devices that share a feature or characteristic in their ability to interact with the device local to the user are provided to the user.

By displaying a subset of available devices, the user's experience is further streamlined and connecting to a device is made easier by the availability of fewer, intelligently-selected options.

Referring back to FIG. 4, at 406, the apparatus receives a user input. At 408, based on a relationship between the user input and the outputted indication, the apparatus selects the discovered wireless device. The user input is correlated to the outputted indication of discovered devices. The user input is received by one or more of a selection from a UI, where the UI illustrates the spatial location for each of the devices (e.g., as shown in FIG. 5), an audio prompt from the user (e.g., as described below), or haptic cues, such as a gesture in a direction of the selected device.

According to one example, a user of the mobile device 202 receives the spatial indication of available devices as shown at 500 in FIG. 5. In response, the user may select a desired device via a touchscreen of the UI. For example, the user taps the image of the speakers to indicate that the user wishes to pair the mobile device 202 with the speakers 208.

According to another example, the user of the mobile device provides an auditory prompt by saying "right speaker." The mobile device 202 is configured to receive and process the auditory prompt. In this example, the mobile device is configured to receive "right speaker," correlate the received auditory prompt with the discovered speaker and outputted indication of the speaker, and pair with the speakers 208 on the right of the user.

According to another example, the user of the mobile device gestures in the direction of the speakers 208. The user points the mobile device 202 in the direction of the speakers. Accordingly, gesturing or moving the phone in the direction of the speakers 208 is correlated with the discovered location and outputted indication of the speakers, and the gesturing or moving initiates pairing of the mobile device 202 with the speakers 208. The gesture may also include the user pointing a finger at the object on the augmented reality overlay screen on mobile device 202.

According to yet another example, a user of the mobile device gestures in the direction of the speakers and provides a voice command "pair." The UI of the mobile device is configured to process both the haptic cues and auditory prompts and will initiate the pairing process between the mobile device and speakers.

Shifting to the environment illustrated in FIG. 3, in one aspect, the headset 302 recognizes speech via automatic speech recognition (ASR) running in the headset or on an attached device. As mentioned in the discussion of the spatial output, the headset 302 has an accelerometer that identifies when the user is looking at a pair-able or connectable device. In this manner, a user of the headset 302 looks in the direction of the television 306 to which it wants to pair, and issues a voice prompt "pair." The headset 302 is configured to process both the movement of the headset and audible voice command and will pair with the television. Of course, other words may be used, such as "listen to that."

When spatialized audio prompts for available devices are not needed, a neck-worn device, eye-glasses, or other wearable detects motion, decodes the user's control command (e.g. through ASR, or a gesture, or button press, or eye movement), and initiates appropriate pairing or control operation via the wireless connection in accordance with aspects described herein.

With reference to FIG. 4, at 410, the apparatus interacts with the selected device. Interacting with the selected device includes communicating with or controlling the selected device. Examples of interacting include streaming data from the mobile device 202 to the speakers 208, or the headset 302 receiving an audio stream from the television 306. According to aspects, the mobile device 202 or wireless, directionally-aware headset 302 are augmented reality devices, providing the user an intuitive view of what devices are available, and allowing for easy, seamless, hands-free interaction.

Other examples of interacting with a device include hands-free control of consumer electronics (e.g. changing television channels, starting audio output from a self-contained audio player), control of appliances (e.g. configuring and starting a washing machine), reading information from sensors (e.g. obtaining the weather report from a weather monitor), and so on.

As another example, a user of the headset 302 wirelessly connects to and controls a Bluetooth-enabled light switch on a wall. The user of the headset 302 may initiate control by looking at the switch and saying "on" or "off." The user of the headset 302 may simply nod or point in the direction of the light switch. This movement is recognized by the headset and control between the headset and light switch will occur. The first time the user attempts to control the switch, if pairing is required to do so, pairing will also be activated.

While aspects of the present disclosure are described with reference to devices configured to communicate via a Bluetooth connection, controllable devices do not need a fully-featured and robust wireless link between the user's sensing device and the device to be controlled. A radio frequency beacon enables the user-worn device to detect the direction and angle of a controllable device. This beacon also supplies an address by which the user's sensing device can connect to the controllable device that differs from the radio frequency beacon, for example an internet address. This allows an internet-connected device to advertise its location and internet address via the radio frequency beacon. Thereafter, the user-worn device controls controllable device via the internet (assuming the user-worn device also has an internet connection, for example, via an 802.11 connection). Such functionality advantageously adds a user interface to all IoT devices, which are typically of low-cost, possibly small in size, and do not contain a full user interface. Through adoption of a standardized interface format, the user may control internet-connected objects around them. Similar to the mobile device 202 and headset 302, the user's sensing device is used to provide an augmented-reality interface for the user.

The above description focuses on a mobile device or headset for illustrating example uses for spatialized output of discovered devices and selection of a desired device with which to pair; however, aspects of the present disclosure are not so limited. Thus, visual cues via a video overlay from head-worn glasses can be used to implement aspects described herein. Further, as described above, haptic cues are used to receive an indication of a selected device.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communication by a headset, comprising:
   determining, by the headset, a set of two or more discovered wireless devices that share a feature or characteristic in their ability to interact with the headset;
   determining, by the headset, a spatial location for the set of discovered wireless devices;
   determining, by the headset, a subset of the two or more discovered wireless devices having auditory functions relevant to the headset;
   outputting, by the headset, an indication of corresponding spatial locations of the subset via at least haptics;
   receiving, by the headset, a user input;
   based on a relationship between the user input and the outputted indication, selecting, by the headset, one of the devices in the subset; and
   interacting, by the headset, with the selected device.

2. The method of claim 1, wherein outputting the indication of the corresponding spatial locations of the subset further comprises:
   outputting a spatialized audio prompt based, at least in part, on the spatial location for the discovered wireless devices in the subset.

3. The method of claim 2, wherein the spatialized audio prompt announces a type of the discovered wireless devices in the subset and direction of the discovered wireless devices in the subset relative to the headset.

4. The method of claim 2, further comprising:
   determining a direction of the headset correlates with a location of the discovered wireless devices in the subset; and
   outputting the spatialized audio prompt and the haptics based, at least in part, on the correlation.

5. The method of claim 1, further comprising:
   determining a change in an orientation of the headset; and
   updating the outputted indication of the corresponding spatial locations of the discovered wireless devices in the subset based on the determined change.

6. The method of claim 1, wherein receiving the user input comprises:
   receiving a selection that includes the selected device via an audio input.

7. The method of claim 1, wherein receiving the user input comprises:
   receiving a selection of the device in the subset via a gesture in a same direction as a location of the device in the subset.

8. The method of claim 1, wherein the interacting comprises:
   pairing with the selected device; and
   wirelessly communicating with the selected device.

9. The method of claim 1, wherein the headset is configured to wirelessly communicate with the selected device via a Bluetooth connection.

10. The method of claim 1, wherein determining the subset is based on at least one of learned behavior and past usage of the headset.

11. A headset for wireless communication, comprising:
    a processor configured to:
    determine a set of two or more discovered wireless devices that share a feature or characteristic in their ability to interact with the headset;
    determine a spatial location for the set of discovered wireless devices; and
    determine a subset of the two or more discovered wireless devices having auditory functions relevant to the headset;
    at least one speaker configured to output an indication of corresponding spatial locations of the subset via at least haptics;
    a receiver configured to receive a user input; and
    a communication unit configured to interact with the discovered device,
    wherein the processor is further configured to select one of the devices in the subset for interaction based on a relationship between the user input and the outputted indication.

12. The headset of claim 11, wherein the at least one speaker is configured to output the indication of the corresponding spatial locations of the subset by outputting a spatialized audio prompt based, at least in part, on the spatial locations for the discovered wireless devices in the subset.

13. The headset of claim 12, wherein the spatialized audio prompt announces a type of the discovered wireless devices in the subset and direction of the discovered wireless devices in the subset relative to the headset.

14. The headset of claim 12,
wherein the processor is further configured to determine a direction of the headset correlates with a location of the discovered wireless devices in the subset, and
wherein the at least one speaker is configured to output the spatialized audio prompt and the haptics based, at least in part on the correlation.

15. The headset of claim 11,
wherein the processor is further configured to determine a change in an orientation of the headset, and
wherein the at least one speaker is further configured to update the outputted indication of the corresponding spatial locations of the discovered wireless devices in the subset based on the determined change.

16. The headset of claim 11, wherein the processor is further configured to determine the subset based on at least one of learned behavior and past usage of the headset.

* * * * *